United States Patent
Masters et al.

(10) Patent No.: US 7,674,074 B2
(45) Date of Patent: Mar. 9, 2010

(54) ROV FRIENDLY VORTEX INDUCED VIBRATION INHIBITOR AND METHOD OF USE

(75) Inventors: Rodney H. Masters, Houston, TX (US); Kinton Lawler, Fulshear, TX (US); Randy W. Masters, Houston, TX (US); Michael P. Sykes, Spring, TX (US)

(73) Assignee: VIV Suppression, Inc., Houston, TX (US)

( * ) Notice: Subject to any disclaimer, the term of this patent is extended or adjusted under 35 U.S.C. 154(b) by 0 days.

(21) Appl. No.: 11/577,222

(22) PCT Filed: Nov. 14, 2005

(86) PCT No.: PCT/US2005/041137

§ 371 (c)(1),
(2), (4) Date: Apr. 13, 2007

(87) PCT Pub. No.: WO2006/053285

PCT Pub. Date: May 18, 2006

(65) Prior Publication Data

US 2008/0050181 A1   Feb. 28, 2008

Related U.S. Application Data

(60) Provisional application No. 60/627,408, filed on Nov. 12, 2004.

(51) Int. Cl.
    *F15D 1/00* (2006.01)
(52) U.S. Cl. ...................................................... 405/216
(58) Field of Classification Search ......... 405/211–216; 29/281.1; 114/243
    See application file for complete search history.

(56) References Cited

U.S. PATENT DOCUMENTS

| | | | |
|---|---|---|---|
| 5,015,372 A * | 5/1991 | Mercer et al. | ............... 239/602 |
| 6,113,313 A * | 9/2000 | Blair et al. | .................. 405/216 |
| 6,347,911 B1 * | 2/2002 | Blair et al. | .................. 405/216 |
| 2003/0213113 A1 * | 11/2003 | McMillan et al. | .......... 29/281.1 |

* cited by examiner

*Primary Examiner*—Sunil Singh
(74) *Attorney, Agent, or Firm*—Keeling Patents & Trademarks LLC; Kenneth A. Keeling; Melissa M. Martinez

(57) ABSTRACT

The present invention discloses a vortex induced vibration inhibitor ("VIVI") comprising a hollow cylindrical housing having an elongated opening defined by locking edges. The housing is operable between an open and a closed position. Connecting assemblies include barbed connector pins received in grooved housings. Connector slots are provided in the connector and receptor housings. Retainer pins provide for release of connecting assemblies. Spacers are provided to limit movement of the housing in relation to the surrounded structure. An alignment stub is provided.

25 Claims, 10 Drawing Sheets

ROV FRIENDLY VORTEX INDUCED VIBRATION INHIBITOR AND METHOD OF USE

CROSS-REFERENCE TO RELATED APPLICATIONS

This application claims the benefit of U.S. Provisional Patent Application No. 60/627,408 entitled, "ROV Friendly Vortex Induced Vibration Inhibitor," filed Nov. 12, 2004 in the United States Patent and Trademark Office and to International Application Number PCT/US2005/041137 entitled, "ROV Friendly Vortex Induced Vibration Inhibitor," filed Nov. 14, 2005 with the United States Patent and Trademark Receiving Office.

STATEMENT REGARDING FEDERALLY SPONSORED RESEARCH OR DEVELOPMENT

Not Applicable.

BACKGROUND OF THE INVENTION

1. Field of the Invention

The present invention relates to reduction of vortex-induced vibrations on submerged cylindrical pipelines, risers, and tendons. Specifically, this invention relates to the vortex induced vibration inhibitors installed on submerged cylindrical pipelines, risers, and tendons.

2. Description of the Related Art

Submerged cylindrical pipelines, risers, and tendons are subjected to vibrations caused by the periodic shedding of eddies resulting from fluid flow. The vibrations place additional stress on the pipelines, risers, and tendons and reduce their fatigue lives. Vortex induced vibration inhibitors (VIVIs) are installed onto the vibration sensitive components to eliminate the effects of vortex-induced vibrations.

Strakes are cylindrically shaped housings with fixed fins helically attached to the outer surface. Typically, but not always, strakes are installed on risers, pipelines, and tendons along the sections close to the water's surface where both current and wave forces are encountered.

Fairings have a streamlined (sometimes tear-dropped) cross-sectional shape and include a bearing surface so that they rotate around the riser, pipeline or tendon with the direction of current flow. Typically, fairings are used at depths well below the surface so that wave forces do not cause premature wear of the rotational bearing pads.

Many deepwater offshore platforms and many floating platforms have been installed without VIVIs. It was learned that ocean currents induced vibrations in platform support structures. The solution to eliminating vortex-induced vibrations on existing structures is to add fixed-fin vortex strakes or fairings to the long cylindrical components of these structures. In light of more recent findings showing that ocean currents are much stronger than originally thought, retrofitting existing structures with VIVIs is desirable.

The preferred method of retrofitting existing risers, pipelines, and tendons with VIVIs is to utilize a remotely operable vehicle (ROV). An ROV is an underwater robot that is typically controlled from the surface. The ROV may be equipped with hydraulic manipulators, or arms, to assist in performing subsea tasks, and with special tooling to install VIVIs onto underwater structures.

To prepare prior art VIVIs for installation by an ROV, the VIVIs are retrofitted with hardware, such as handles and ropes. Several retrofitted VIVIs may be placed onto a piece of staging equipment that is lowered to an area proximate the submerged component or the retrofitted VIVI may be lowered individually by a crane. An ROV, equipped with arms, grasps one VIVI at a time and transports it to a submerged cylindrical component.

A vision system and a remote control system allow an operator to maneuver the ROV to the staging area and remove the VIVI. Once the submerged component is nested within the VIVI, the ROV disengages from the VIVI and maneuvers to the opposite side of the VIVI and component. The ROV operator then uses the vision system to locate handles or ropes and grasp them with tooling on the ROV arms. The arms may then be moved to close the VIVI around the submerged component.

Prior art VIVIs are often destroyed when they are forcibly removed. Further, the VIVI often damages the coating on the submerged components as they are removed. It would be an improvement to the art to have a releasable locking mechanism that permits the removal of a VIVI without damaging either the VIVI or the coating of the submerged component.

It would be a further improvement to the art to have engagement points that permit the use of simple tooling on the ROV to engage and install the VIVIs around a submerged component.

It would be a further improvement to the art to have engagement points that permit the use of simple tooling on the ROV to engage and install the around a submerged component.

It would be a further improvement of the art to have a system where multiple VIVI's may be efficiently installed around a submerged component.

BRIEF SUMMARY OF THE INVENTION

Accordingly, it is an object of the present invention to provide a device for reducing the vortex vibrations caused by water current.

It is another object of the present invention to provide a connector assembly to interface between an ROV and a VIVI.

It is another object of the present invention to provide connector assemblies that are integral with the surface of the VIVI.

It is another object of the present invention to provide connector assemblies that allow for efficient and quick engagement and disengagement between an ROV and a VIVI.

It is another object of the present invention to provide a connector assembly that permits maneuverability of a VIVI by an ROV.

It is another object of the present invention to provide a connector in which an ROV need only engage with a VIVI a single time to move it to a submerged component, place the VIVI around the component and lock the VIVI in place around the submerged component.

It is another object of the present invention to provide a releasable locking mechanism permitting the VIVI to be removed from a submerged component without damaging the VIVI or submerged component, thereby making the VIVI reusable.

It is another object of the invention to provide a flexible VIVI.

It is another object of the invention to provide a VIVI front housing and pivot sections as a unitary structure.

It is another object of the invention to induce frictional interaction between the VIVI and the submerged component.

The present invention discloses a ROV friendly vortex induced vibration inhibitor ("VIVI") for installation on a subsea structure, such as a riser or pipeline. The VIVI eliminates the effects of vortex-induced vibrations on the cylindrical structure. The VIVI includes a housing, connector assemblies, fins, a plurality of annulus spacers, and an alignment stub. The housing is cylindrically formed and preferably constructed of a flexible material, such as high-density polyethylene. One or more fins are formed or attached helically around the outer surface of the housing along the longitudinal length. An alignment stub extends outwardly from the housing and is an engagement member for an ROV tool. A plurality of connector assemblies permit secured closure of the housing and provide additional engagement points for the ROV tool. The connector assemblies are removable, thereby allowing subsequent removal of the VIVI from the cylindrical structure without causing damage to the connector assemblies, the housing, or the cylindrical structure. A plurality of annulus spacers are provided along the housing to induce friction between the VIVI and the cylindrical structure.

Other features and advantages of the invention will be apparent from the following description, the accompanying drawing and the appended claims.

DESCRIPTION OF THE INVENTION

Figure 1:
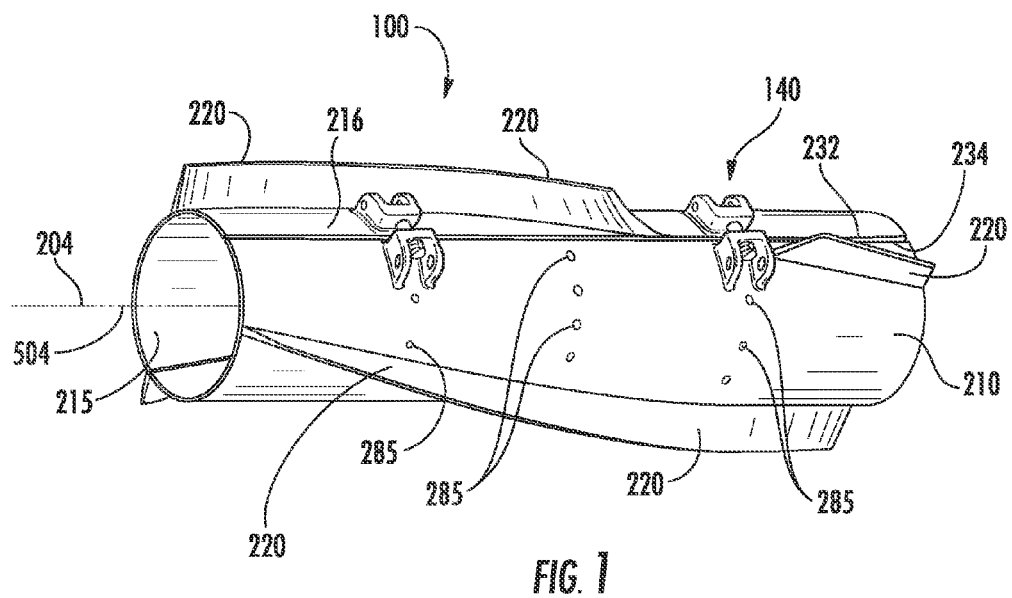
FIG. 1 is a perspective of the preferred embodiment of the VIVI of the present invention.
Figure 2:
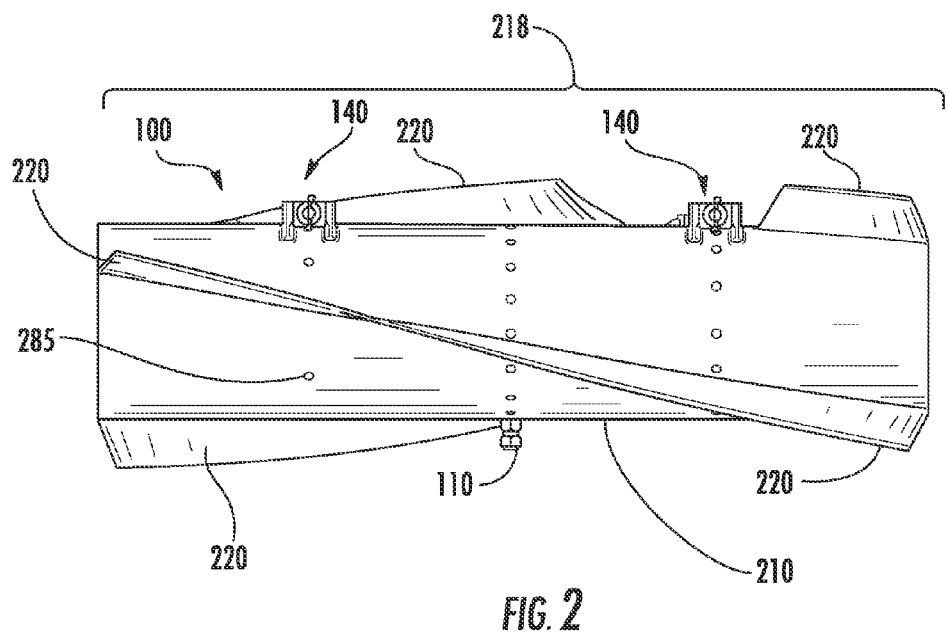
FIG. 2 is a side view of the preferred embodiment of the VIVI of the present invention.

Referring to FIGS. 1 and 2, the preferred embodiment of a vortex induced vibration inhibitor ("VIVI") 100 for installation by a remotely operable vehicle (ROV) (not shown) is depicted. VIVI 100 includes connector assemblies 140 for the installation of VIVI 100 on a submerged component by an ROV, fins 220 and an alignment stub 110.

Referring to FIGS. 1, 2 and 3a and 3b, VIVI 100 comprises a housing 210 and at least one fin 220. Housing 210 is cylindrically shaped with an inner diameter 212 and an outer diameter 214. Inner diameter 212 accommodates an elongated, usually cylindrical, structure 500 (depicted with dashed line in FIG. 3), such as a riser, tendon, or pipeline. Housing 210 has a housing axis 204 and structure 500 has a structure axis 504. Housing axis 204 and structure axis 504 are coaxially aligned.

Figure 3A:
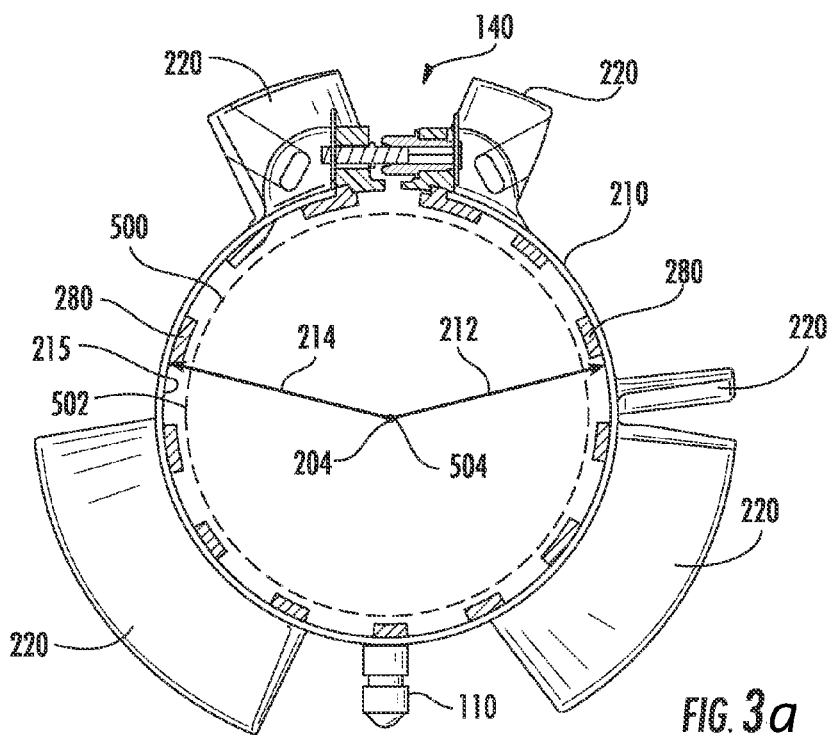
FIG. 3a is an end view of the preferred embodiment of the VIVI of the present invention with the wings in a closed position.
Figure 3B:
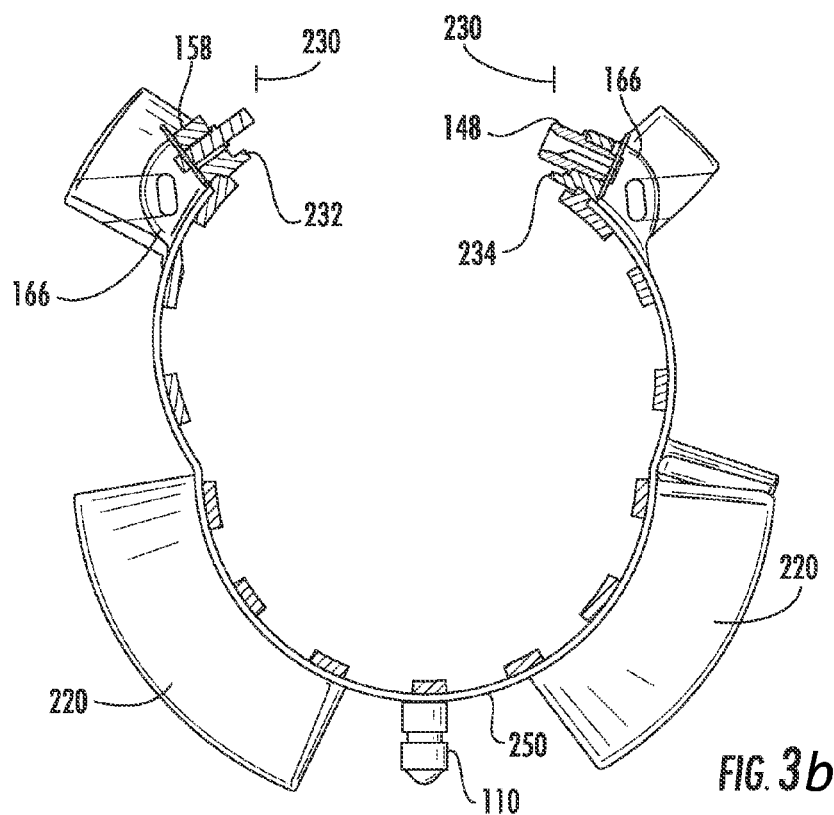
FIG. 3b is a cut away end view of the preferred embodiment of the VIVI of the present invention with the wings in an open position.
Figure 4:
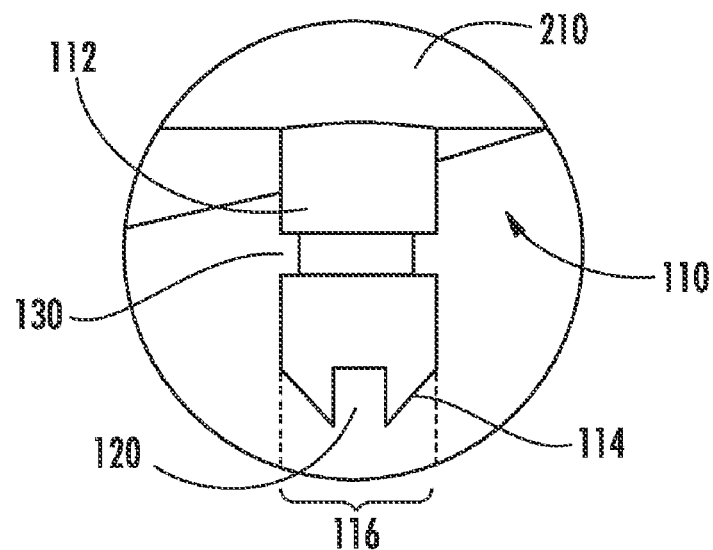
FIG. 4 is a side view of an alignment stub.

As depicted in FIGS. 3a and 3b, housing 210 extends from a first locking edge 232 to a second locking edge 234. When housing 210 is in a closed position, first locking edge 232 and second locking edge 234 abut.

In the preferred embodiment, housing 210 is constructed of a flexible material, such as high-density polyethylene. High-density polyethylene is preferred due to its density, which aids in housing 210 achieving neutral buoyancy, and due to its flexibility, enabling VIVI 100 to flexibly open and receive structure 500.

In the preferred embodiment of the invention, housing 210 is a unitarily formed cylindrical structure. One or more fins 220 are formed or attached helically around the outer surface 216 of housing 210 along the longitudinal length 218. The number of fins 220 most effective for reducing eddy formation is determined by the outer diameter of the structure 500 on which VIVI 100 is installed.

Referring to the preferred embodiment depicted in FIGS. 2, 3a, 3b and 4, alignment stub 110 extends outwardly from front housing 250 and is an engagement member for an ROV tool (not shown). Alignment stub 110 has an alignment stub body 112. In the embodiment depicted, stub body 112 is cylindrical. A top surface 114 having a top width 116 is provided distal housing 210. Preferably, strake housing 210 and alignment stub 110 are integrally formed such that stub 110 is an extension of housing 210.

The shape of alignment stub body 112 and the size of top surface 114 are determined by the tooling on the ROV. Top surface 114 may be tapered to aid in the engagement of alignment stub 110 by the ROV engagement tool.

Preferably, alignment stub 110 is centrally located on front housing 250. By locating alignment stub 110 at a central point both longitudinally and laterally on front housing 250, the weight of the VIVI 100 will be evenly distributed when VIVI 100 is engaged at stub 110. This even weight distribution aids in manipulation of VIVI 100 by an ROV.

Alignment key 120 allows rotational control of VIVI 100 by the ROV. Alignment key 120, in the embodiment depicted, comprises a channel extending across upper surface 114 of stub 110. The geometry of alignment key 120 is determined by the tooling on the ROV. A variety of alignment key 120 geometries are contemplated being either formed into or extending from top surface 114, including channels of a determined geometry in upper surface 114 or extensions of a determined geometry extending outwardly from upper surface 114.

A stub grip 130 provides a grasping surface for the ROV manipulation tool to firmly grasp the VIVI 100. Stub grip 130 is formed into alignment stub body 112 and is located intermediate top surface 114 and front housing 250. In the embodiment depicted, stub grip 130 comprises a channel extending laterally around stub body 112. A variety of stub grip 130 geometries are contemplated being either formed into or extending from stub body 112, including channels of a determined geometry in stub body 112 or extensions of a determined geometry extending outwardly from stub body 112.

A different configuration of alignment stub 110 may be utilized to conform to determined ROV grasping tooling.

Housing 210 is susceptible to rotational and axial movement in relation to structure 500. To limit rotational and axial movement, annulus spacers 280 are installed along inner surface 215 of housing 210.

Figure 8:
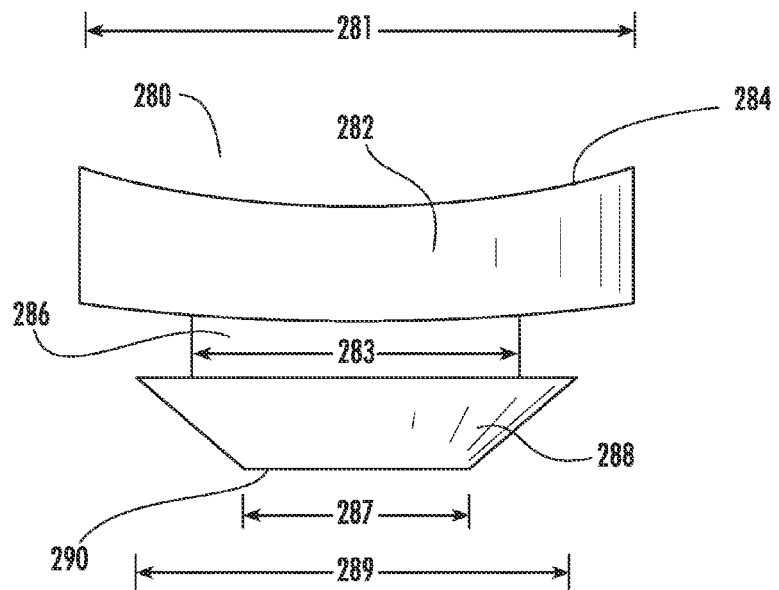
FIG. 8 is a view of an annulus spacer.

Inner diameter 212 accommodates annulus spacers 280. Referring to FIG. 8, annulus spacer 280 has an inner spacer member 282, a spacer recess 286, and a spacer retainer 288. Inner spacer member 282 has a spacer member diameter 281, which is larger than the diameter of spacer hole 285. Spacer recess 286 has a recess diameter 283. Recess diameter 283 is sized to be equal to or smaller than the diameter of spacer hole 285. Spacer retainer 288 comprises a truncated cone having a retainer base diameter 289 and a retainer head diameter 287. Retainer head diameter 287 is preferably smaller than retainer base diameter 289. Retainer head diameter 287 is also preferably smaller than the diameter of spacer hole 285, while retainer base diameter 289 is preferably larger than the diameter of spacer hole 285. This configuration allows spacer retainer 288 to be readily installed by inserting into spacer hole 285.

Each spacer 280 is inserted through spacer hole 285 in housing 210 from inner surface 215, wherein retainer head tip 290 is aligned with spacer hole 285, and a determined force is asserted against spacer surface 284 until retainer base 291 passes through spacer hole 285 and retainer base 291 abuts the exterior surface 216 of housing 210. Therefore, when installed, spacer recess 286 is aligned with housing 210, and inner spacer member 282 abuts interior surface 215 of housing 210. Inner spacer member 282 is preferably configured and sized such that it cannot be deformed to pass through spacer hole 285. Spacer retainer 288 is sufficiently flexible that it may be elastically deformed to pass through spacer hole 285.

Annulus spacers 280 are sized such that inner spacer member 282 abuts outer surface 502 of structure 500 when VIVI 100 is installed on structure 500. In the preferred embodiment, spacer surface 284 is concave, preferably contouring outer surface 216 of housing 210. This configuration provides a suction effect between spacer surface 284 and structure 500. While frictional spacer surface 284 is preferably concave, other configurations are possible (not shown).

Annulus spacers 280 are constructed of material suitable to induce frictional interaction between housing 210 and structure 500. In a typical application commercially available, 70-80 shore urethane is practiced. When VIVI 100 is installed on structure 500, annulus spacers 280 collectively reduce relative rotational and axial movement of housing 210 in relation to structure 500 by hoop stress and frictional resistance to movement. Further, annulus spacers 280 maintain a gap between housing 210 and structure 500, thereby allowing water flow between housing 210 and structure 500.

Referring to FIGS. 1, 2, 3a, and 3b, a plurality of connector assemblies 140 are located proximate first and second locking edges 232 and 234, thereby permitting connection of first locking edge 232 to second locking edge 234. Housing 210 is depicted in a closed position in FIG. 3a, and in an open position in FIG. 3b.

Each connector assembly 140 comprises a connector insert assembly 158 and a connector receptor assembly 148. Connector insert assembly 158 is attached to a connector base 166 proximate first locking edge 232. Connector receptor assembly 148 is attached to a connector base 166 proximate second locking edge 234. Insert assembly 158 and receptor assembly 148 are aligned so that connector pin 170 is received in receptor 172 when housing 210 is in a closed position, as depicted in FIGS. 1 and 3a.

In a preferred embodiment, at least two sets of connector assemblies 140 are provided on each VIVI 100. Each connector assembly 140 is intermediate alignment stub 110 and an end of vIvI 100.

Figure 6A:
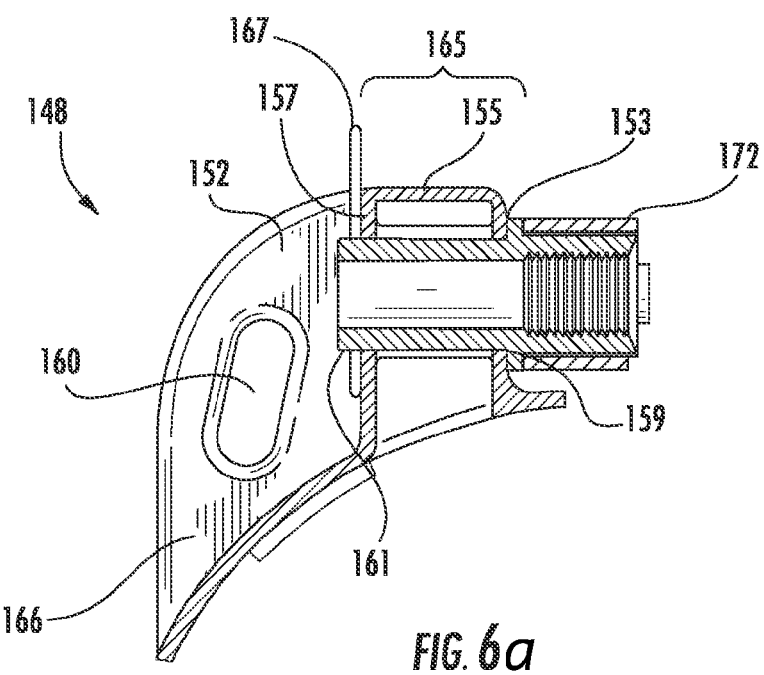
FIG. 6a is a cross-sectional side view of the preferred embodiment of a connector receptor.
Figure 6B:
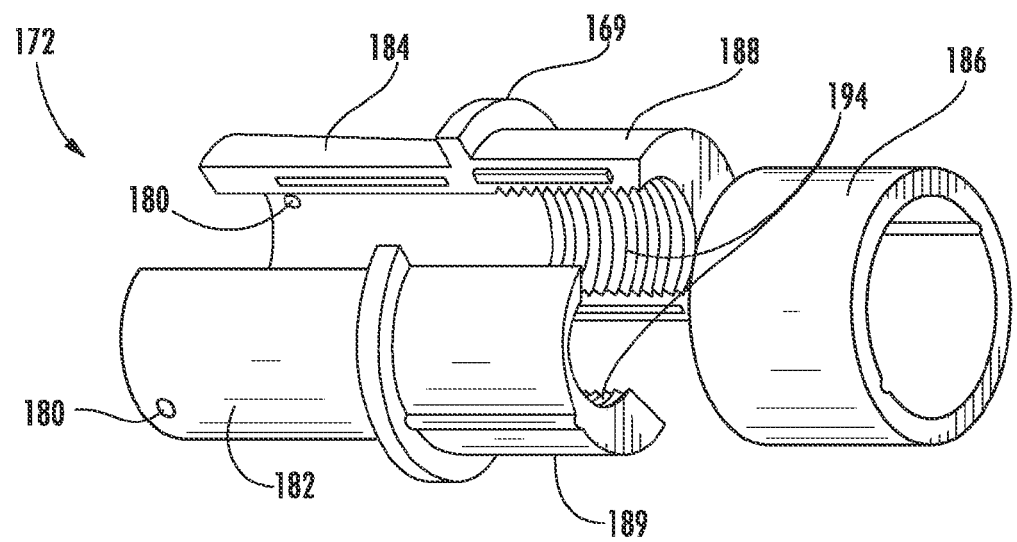
FIG. 6b is an isometric view of the preferred embodiment of a connector receptor sleeve.
Figure 7A:
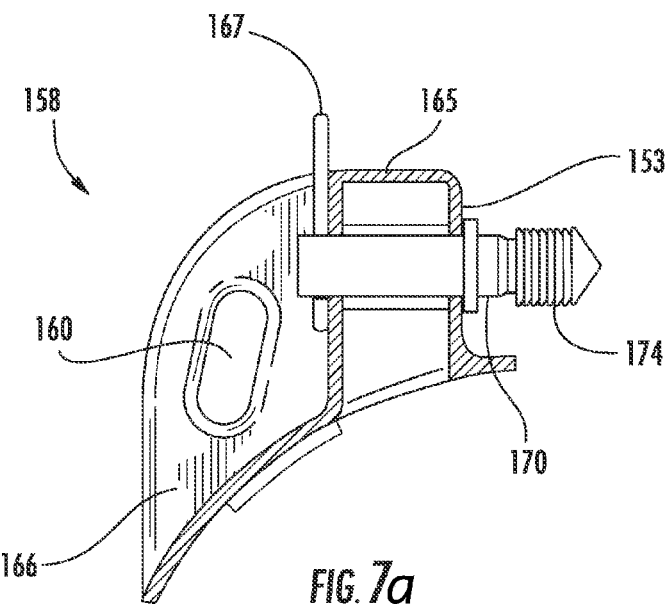
FIG. 7a is a side view of the preferred embodiment of a connector insert.
Figure 7B:
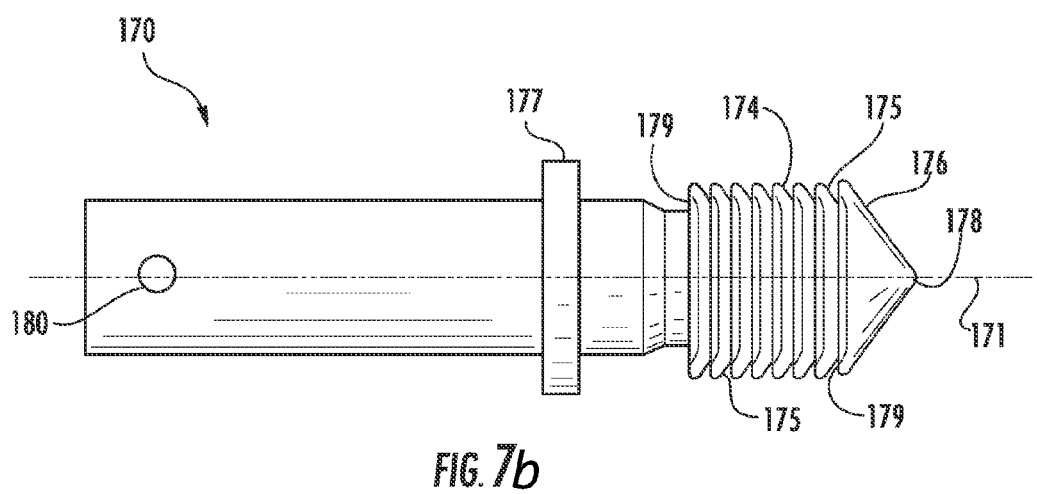
FIG. 7b is a top view of the preferred embodiment of a connector pin.

Referring to FIGS. 6b and 7b, connector receptor 172 comprises receptor segments 182 and 184, and receptor retaining sleeve 186. Receptor segments 182 and 184, when connected, comprise a hollow cylinder. Receptor retaining sleeve 186 holds receptor segments 182 and 184 in a joined position. Receptor retaining sleeve 186 covers at least a portion of the exterior surfaces of receptor segments 182 and 184. In the preferred embodiment, receptor retaining sleeve 186 slidingly fits over grooved ends 188 and 189 of segments 182 and 184. Holes 180 are provided in segments 182 and 184 distal grooved ends 188 and 190 for insertion of a retainer pin 167.

A plurality of grooves 194 are provided on the interior surfaces of segments 182 and 184 proximate grooved ends 188 and 189. Receptor 172, grooves 194, connector pin 170 and barbs 174 are so sized in relation to each other that connector pin 170 may be inserted into receptor 172 by a determine pushing force. Once inserted, barbs 174 and grooves 194 interlock to prevent removal of connector pin 170 from receptor 172 without application of a determined pulling force. Each barb 174 is provided with an inclined front face 175 and a rear face 179 perpendicular to axis 171 of connector pin 170, thereby allowing the pin 170 to be inserted among grooves 194 of receptor 172 with less force than the force required to pull pin 170 from receptor 172.

Figure 5:
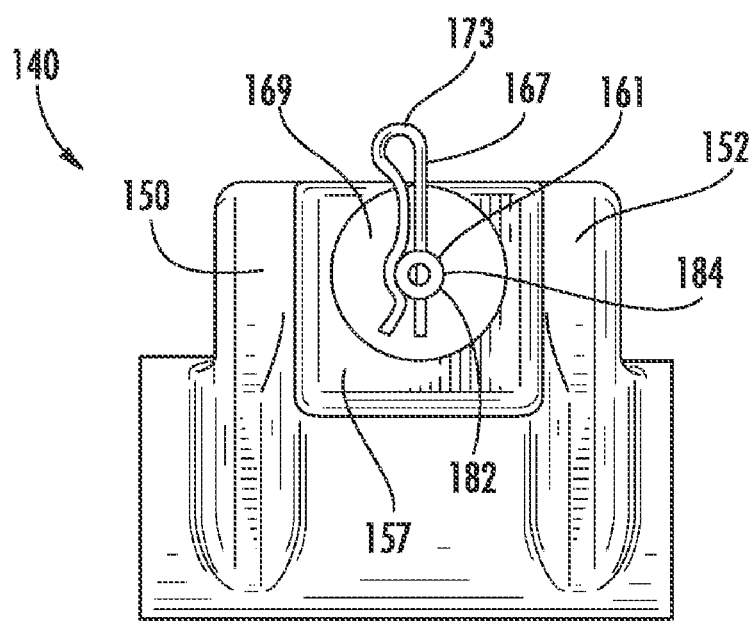
FIG. 5 is an end view of the preferred embodiment of a connector receptor.

Referring to FIGS. 5, 6a and 6b, the arrangement of receptor 172 with connector base 166 is depicted. Connector base 166 includes a base housing 165 having side walls 150 and 152, front wall 153, top 155 and rear wall 157. In the preferred embodiment, base housing 165 is integral with one of locking edge 232 or 234. In an alternate embodiment, base housing 165 is distinct from first locking edge 232 or second locking edge 234, but attached to one of locking edge 232 or 234.

Side walls 150 and 152 of base housing 165 extend outwardly from base housing 165 past rear wall 157. Side walls 150 and 152 are parallel and spaced from each other. Engagement slots 160 are provided in each of side walls 150 and 152. Engagement slots 160 are sized and structured to allow an ROV manipulator tool (not shown), such as a solenoid-operated rod to extend therethrough.

A front wall opening 159 is provided in the front wall 153. A rear wall opening 161 is provided in rear wall 157. Front wall opening 159 and rear wall opening 161 are aligned to allow receptor 172 segments 182 and 184 to extend through front wall opening 159 and rear wall opening 161 and thus through base housing 155. Upon installation of receptor 172 into connector base 166, a retainer pin 167 may be inserted through aligned holes 180. A flange 169 extends outwardly from receptor 172 intermediate grooved ends 188 and 190 and holes 180. Receptor 172, base housing 165 and holes 180 are so structured and aligned that receptor 172 is fixedly retained on connector base 166 with base housing 165 intermediate flange 169 and retainer pin 167.

Pin 167 has a grasping loop 173 extending outwardly from pin 167 and base housing 165 to allow removal of pin 167 by an ROV manipulator tool (not shown). Retainer pin 167 is configured to prevent retainer pin 167 from dislodging when subjected to prolonged vibration. While a cotter pin is depicted in the preferred embodiment, other pin retaining structures may be utilized.

Referring to FIG. 7b, connector pin 170 comprises an elongated cylindrical member having a plurality of barbs 174 extending outwardly from insert end 176. Insert end 176 has a conical insert tip 178. Conical insert tip 178 enhances fitting of insert end 176 into receptor 172. Connector pin 170 is further provided with a hole 180 distal insert end 176 for insertion of a retainer pin 167.

Referring to FIGS. 7a and 7b, the arrangement of connector pin 170 with connector base 166 is depicted. Connector pin 170 is provided with an outwardly-extending flange 177 intermediate barbs 174 and pin opening 180. Connector pin 170 is inserted through front wall 153 and through rear wall 157. Upon installation of connector pin 170 into base housing 165, a retainer pin 167 may be inserted through hole 180. Connector pin 170, base housing 166 and holes 180 are so structured and aligned that connector pin 170 is fixedly retained on connector base 166 with base housing 165 intermediate retainer pin 167 and flange 177. A washer may be used intermediate retainer pin 167 and base housing 165 to prevent wear of the retainer pin 167 on base housing 165.

Referring to FIGS. 5, 7a and 7b, connector pin 170 is provided with an outwardly-extending flange 177 intermediate barbs 174 and pin opening 180. Connector pin 170 is inserted through front wall 153 and through rear wall 157. Upon installation of connector pin 170 into base housing 165, a retainer pin 167 may be inserted through hole 180. Connector pin 170, base housing 166 and holes 180 are so structured and aligned that connector pin 170 is fixedly retained on connector base 166 with base housing 165 intermediate retainer pin 167 and flange 177. A washer (not shown) may be used intermediate retainer pin 167 and base housing 165 to prevent wear of the retainer pin 167 on base housing 165.

In the preferred embodiment, at least one VIVI 100 is attached to a transporting device (not shown). The VIVI is then submerged into a body of water and transported to the point of installation.

As previously described, VIVI 100 is constructed for use with an ROV having manipulator tooling installed on a plurality of arms. Alignment stub grip 130 and alignment key 120 allow the ROV to readily engage VIVI 100. Alignment stub grip 130 allows a fixed lateral position and alignment key 120 allows the VIVI 100 to be rotated about stub 110. An ROV engagement tool engages alignment stub 110 of a predetermined VIVI 100. Two spaced ROV arms have manipulator tools to engage with engagement slots 160 of connector assemblies 140. Once the ROV is fully engaged with VIVI 100, the ROV disengages VIVI 100 from a deployment frame (not shown). The ROV then propels VIVI 100 toward structure 500. The ROV engagement tool then disengages alignment stub 110, with the ROV arms remaining engaged with engagement slots 160. Once alignment stub 110 has been disengaged, the ROV arms may rotate housing 210 into an open position. The ROV arms should rotate housing 210 open until longitudinal opening 230 is sufficiently spaced for receiving structure 500. The ROV engagement tool is disengaged from the alignment stub 110 prior to rotating housing 210 to the open position to limit stress on housing 210.

Once housing 210 has been rotated into an open position, the ROV engages VIVI 100 with structure 500. The ROV arms then rotate housing 210 to a closed position, thereby inserting connector pin 170 into connector receptor 172. The tapered end 178 of connector pin 170 facilitates entry of connector pin 170 into receptor 172. Upon successful attachment of VIVI 100, the ROV tooling releases from VIVI 100 by disengaging its manipulator tools from engagement slots 160.

After installation, connector insert 170 is held within connector receptor 172. If it is subsequently necessary to remove VIVI 100 from the structure 500, an ROV with appropriate manipulator arm tooling or a diver can remove one of the retainer pins 167 from the connector receptor 172 of each connector assembly 140. Upon removal of retainer pin 167, the connector receptor 172 retained by such retainer pin 167 may be disengaged from the connector base 166 while connector insert 170 remains connected to connector base 166. Alternatively, the ROV can remove the retainer pin 167 from the connector insert 170, leaving connector receptor 172 connected to connector base 166. By only disconnecting either the connector receptor 172 or the connector insert 170, housing 210 can be brought to the surface with connector assemblies 140 intact. Further disassembly of connector assembly 140 may be performed at the surface, preventing damage to components of connector assembly 140 and allowing reuse of all components.

A method for installing a VIVI around a structure utilizing a ROV includes engaging at least one receptor engagement slot 160 with at least one receptor engagement tool and engaging at least one insert engagement slot 160 with at least one insert engagement tool; moving the VIVI to a structure 500; opening the VIVI to fit around the structure 500; extending the VIVI around the structure 500; closing the VIVI around the structure 500; and disengaging the respective engagement slots 160. The method may further comprise the step of locking at least one receptor assembly to at least one insert assembly. As discussed previously, the ROV engagement tools may perform the locking step. The locking step may be performed simultaneously with the closing step.

Figure 9:
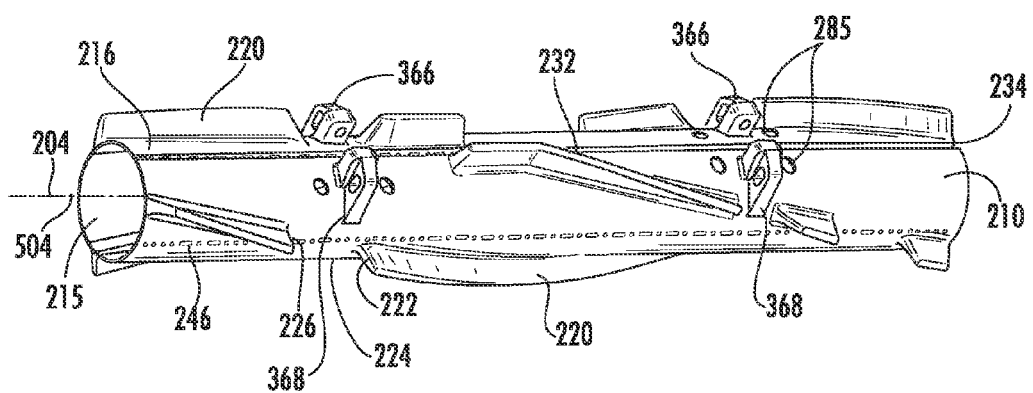
FIG. 9 is a perspective of an alternative VIVI with an alternative connector assembly.
Figure 10A:
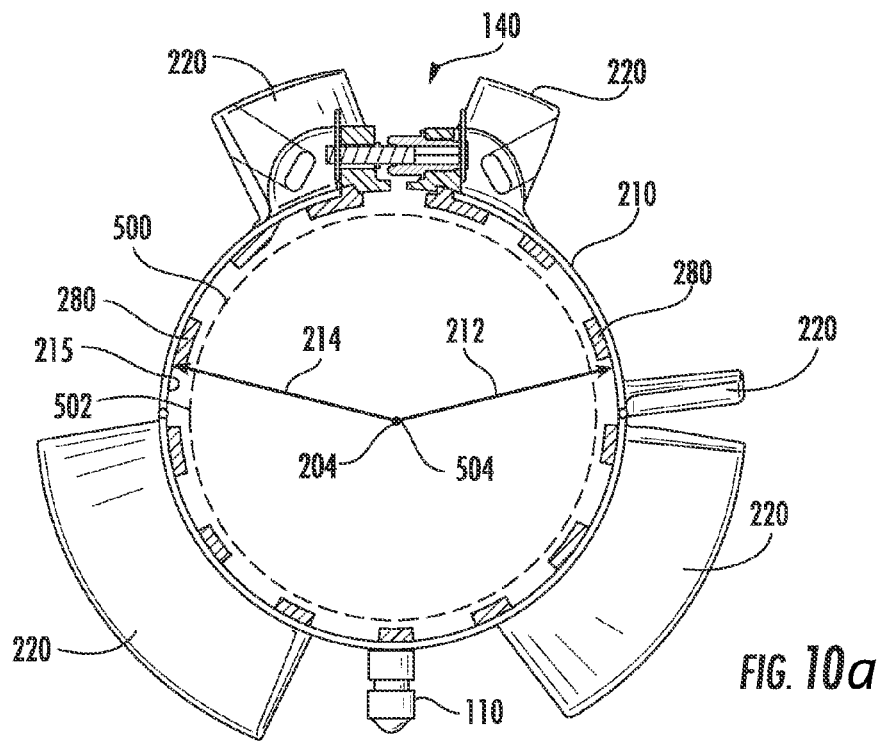
FIG. 10a is a cross-sectional view of an alternative VIVI in the closed position.
Figure 10B:
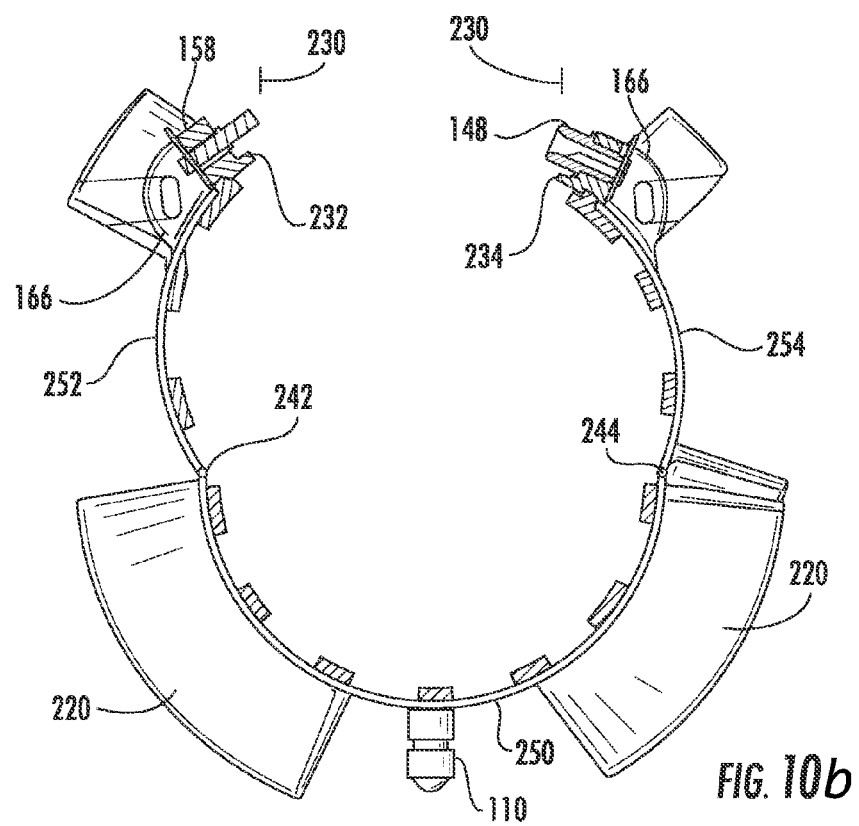
FIG. 10b is a cross-sectional view of an alternative VIVI in the open position.
Figure 11:
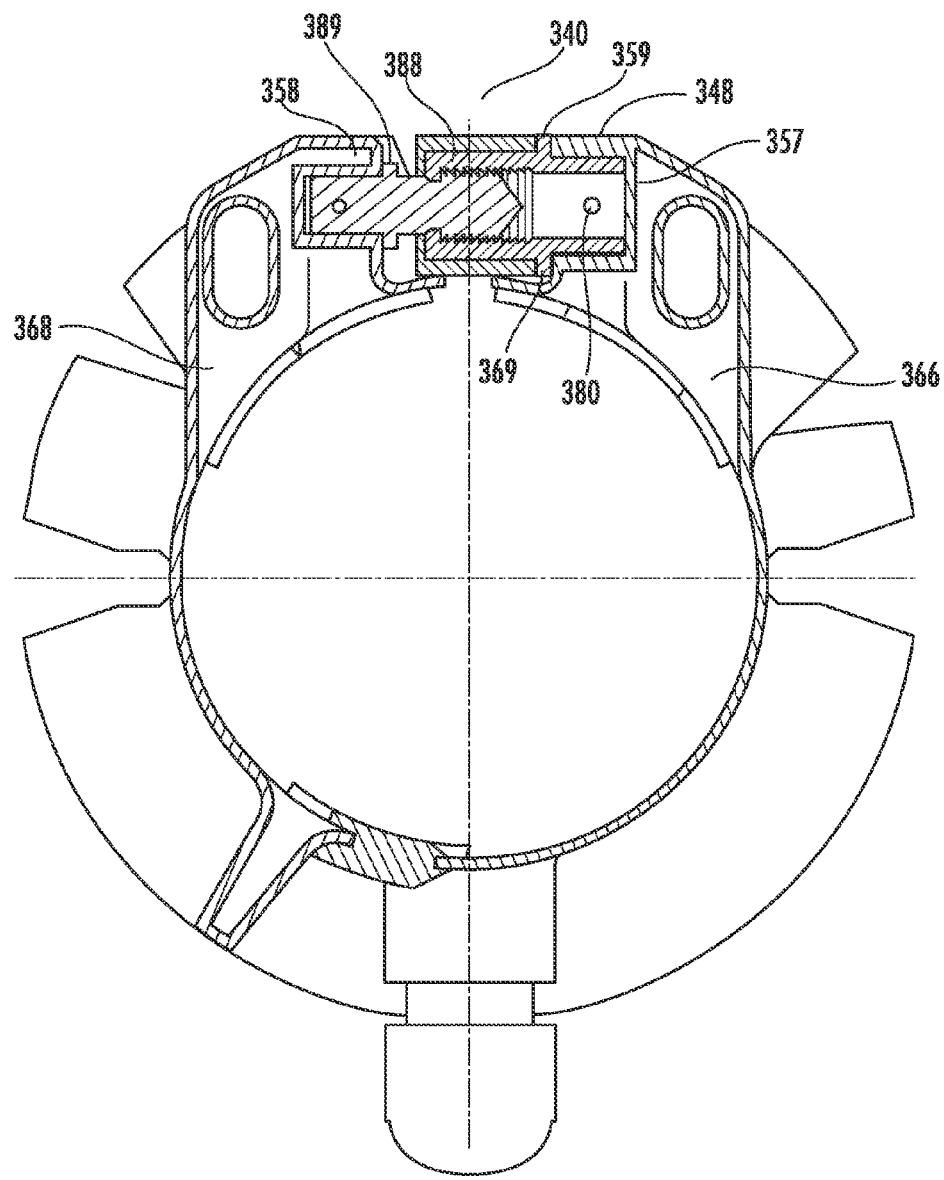
FIG. 11 is a cross-sectional view of an alternative connector assembly.

In an alternative embodiment of the VIVI, depicted in FIGS. 9, 10a, and 10b, housing 210 is preferably manufactured as a single component having a cylindrical shape with a front housing 250 flanked by a first wing 252 along a first pivot line 242 and by a second wing 254 along a second pivot line 244. First wing 252 is rotatable in relation to front housing 250 along first pivot line 242. Second wing 254 is rotatable in relation to front housing 250 along second pivot line 244. First wing 252 has a first lock edge 232 distal first pivot line 242. Second wing 254 has a second lock edge 234 distal second pivot line 244. A longitudinal opening 230 is defined between front first lock edge 232 and second lock edge 234. A plurality of connector assemblies 140 are located on first and second wings 252 and 254, proximate first and second locking edges 232 and 234.

In the alternative embodiment, a series of openings 246 are provided along pivot line 242 and pivot line 244. Openings 246, in the embodiment shown, comprise slots and holes extending through housing 210. Openings 246 enhance preferential bending of the wings 252 and 254 in relation to front housing 250 along pivot lines 242 and 244 as aligned openings 246 provide increased flexibility of housing 210 at openings 246.

In the alternative embodiment, fins 220 terminate in the area proximate pivot line 242 between front housing 250 and first wing 252 and in the area proximate pivot line 244 between front housing 250 and second wing 254. Continuing to refer to FIG. 9, recess 224 between the terminus 222 of fin 220 on front housing 250 and the commencement 226 of fin 220 on second wing 254 permits the rotation of wing 254 to an open position. Like recesses on at pivot line 242 permit rotation of first wing 252.

Housing 210 has elastomeric properties and is flexible between front housing 250 and first wing 252 and between front housing 250 and second wing 254 so that first and second wings 252 and 254 may be rotated to an open position wherein lock edges 232 and 234 are separated, as depicted in FIG. 10b. With wings 252 and 254 opened, housing 210 may be placed around structure 500. Inner surface 215 of housing 210 faces outer surface 502 of component 500 when strake 100 is installed.

In the alternative embodiment of housing 210, fins 220 terminate in the area proximate pivot line 242 between front housing 250 and first wing 252 and in the area proximate pivot line 244 between front housing 250 and second wing 254. Recess 224 between the terminus 222 of fin 220 on front housing 250 and the commencement 226 of fin 220 on second wing 254 permits the rotation of wing 254 to an open position. Like recesses on at pivot line 242 permit rotation of first wing 252.

The installation of the alternative VIVI found in FIGS. 9, 10a, and 10b is consistent with the installation of the preferred VIVI. However, first wing 252 and second wing 254 allow the ROV to remain engaged with alignment stub 110 during installation. This is due to the fact that rotation of first wing 252 and second wing 254 along pivot lines 242 and 244 reduces the stress on housing 210. As the ROV may remain engaged with alignment stub 110, the ROV can assert greater control over VIVI 100.

In a separate alternative embodiment (not shown), housing 210 is molded to provide a reduced cross-sectional area along at least a segment of pivot lines 242 and 244. As with openings 246, the reduced cross-sectional area along pivot lines 242 and 244 enhance bending along pivot lines 242 and 244.

In yet another alternative embodiment (not shown), housing 210 is initially constructed with a distinct front housing 250 and distinct wings 252 and 254. In such embodiment, wings 252 and 254 are attached to front housing 250 with mechanical hinges at pivot lines 242 and 244 such that wings 252 and 254 rotate about pivot lines 242 and 244.

Referring to FIGS. 9, 11, 12, 13, and 14, an alternative connector assembly 340 is depicted. Connector assembly 340 includes a connector receptor assembly 348 and a connector insert assembly 358.

Figure 12:
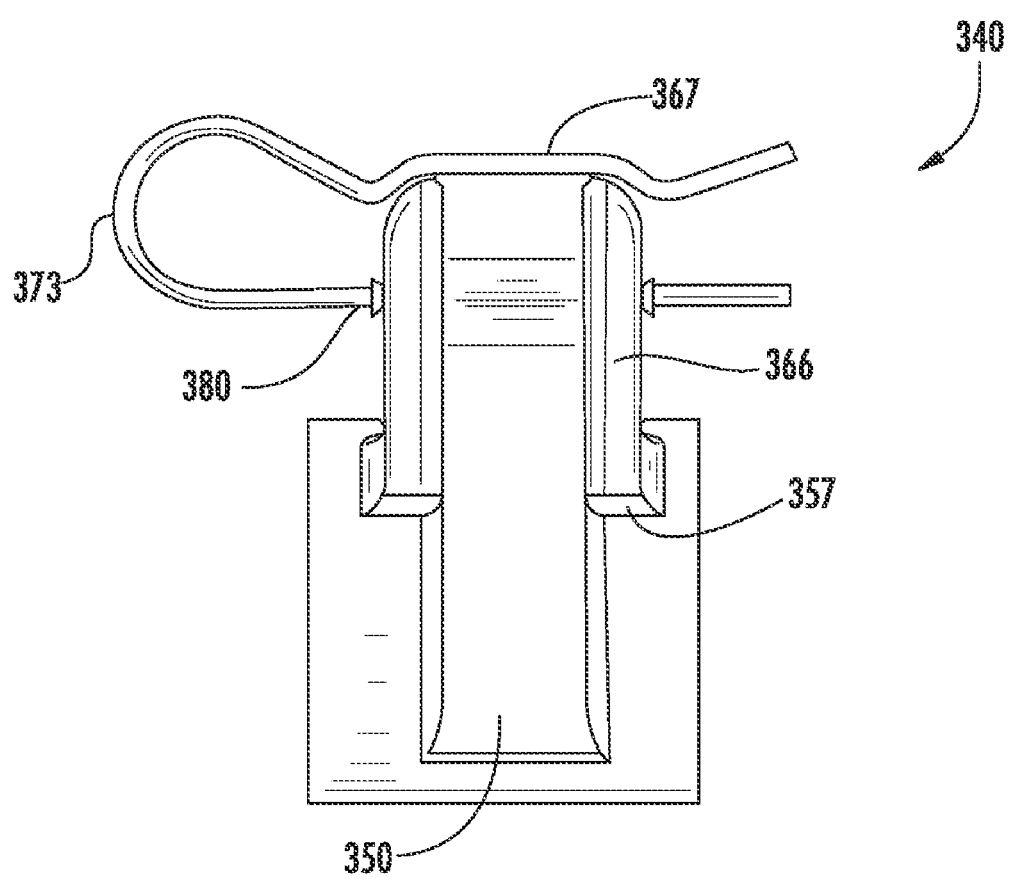
FIG. 12 is an end view of an alternative connector base.
Figure 13:
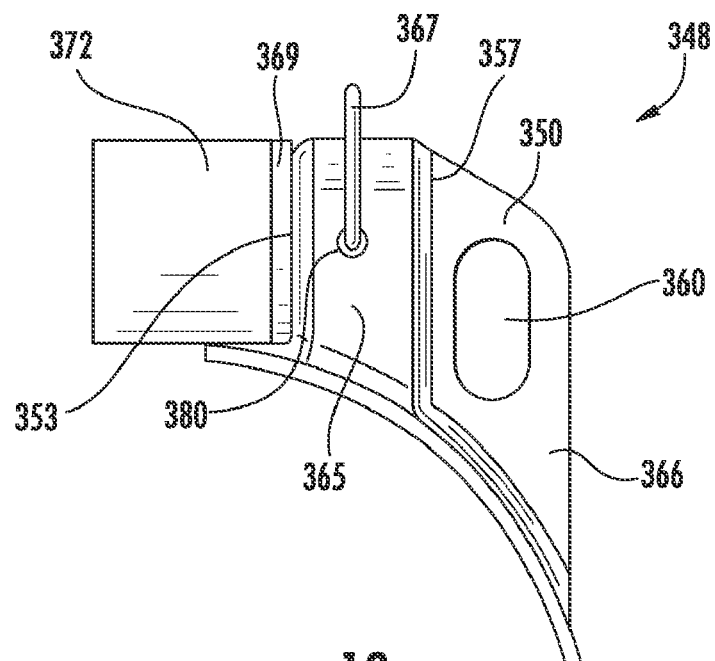
FIG. 13 is a side view of an alternative receptor assembly.

Referring to the receptor assembly 348 depicted in FIG. 12, connector base 366 includes a base housing 365 having a front wall 353 and a rear wall 357.

A front opening 359 (seen in FIG. 11) is provided in the front wall 353, the opening 359 extending to rear wall 357. Opening 359 is sized to allow receptor segments 382 and 384 to extend through opening 359 to abut rear wall 357. Upon installation of receptor 372 into base 366, a retainer pin 367 may be inserted through aligned holes 380. A flange 369 extends outwardly from receptor 372 intermediate grooved ends 388 and 389 and holes 380. Receptor 372, base housing 365 and holes 380 are so structured and aligned that receptor 372 is fixedly retained on connector base 366 with base housing 365 intermediate flange 369 and retainer pin 367.

Pin 367 has a grasping loop 373 extending outwardly from pin 367 and base housing 365 to allow removal of pin 367 by an ROV manipulator tool (not shown).

A rear extension 350 extends outwardly from rear wall 357. Rear extension 350 is provided with an engagement slot 360. Engagement slot 360 is sized and structured to allow an ROV manipulator tool (not shown), such as a hook or a solenoid-operated rod to extend therethrough.

Figure 14:
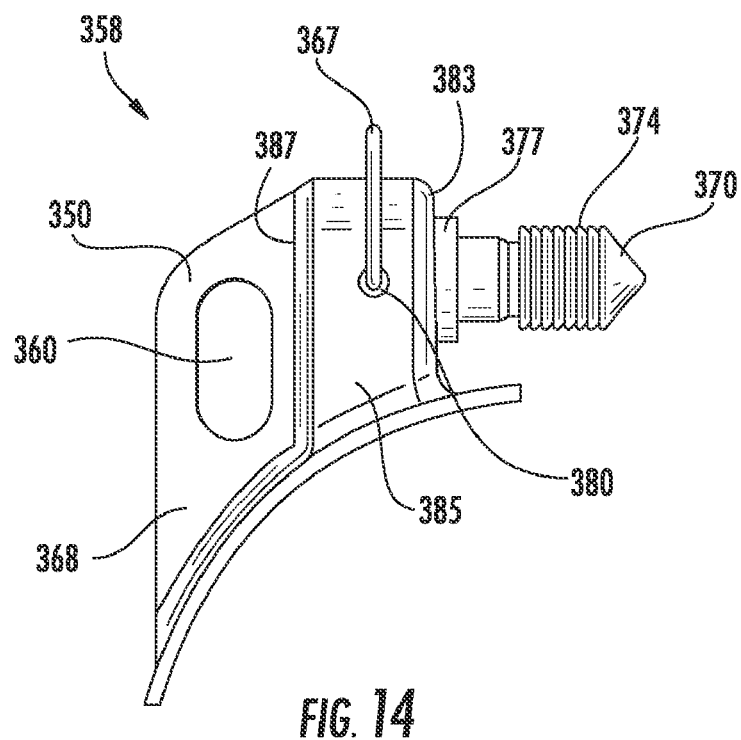
FIG. 14 is a side view of an alternative insert assembly.

Referring to the insert assembly 358 depicted in FIG. 14, connector base 368 includes a base housing 385 having a front wall 383 and a rear wall 387.

A front opening 389 (seen in FIG. 11) is provided in the front wall 383, the opening 389 extending to rear wall 387. Opening 389 is sized to allow connector pin 370 to extend through opening 389 to abut rear wall 387. Upon installation of connector pin 370 into base 368, a retainer pin 367 may be inserted through hold 380. A flange 377 extends outwardly from connector pin 370 intermediate barbed end 390 and hole 380. Connector pin 370, base housing 385 and hold 380 are so structured and aligned that connector pin 370 is fixedly retained on connector base 368 with base housing 385 intermediate flange 377 and retainer pin 367.

Retainer pin 367 has a grasping loop 373 extending outwardly from pin 367 and base housing 385 to allow removal of pin 367 by an ROV manipulator tool (not shown).

A rear extension 350 extends outwardly from rear wall 387. Rear extension 350 is provided with an engagement slot 360. Engagement slot 360 is sized and structured to allow an ROV manipulator tool (not shown), such as a hook or a solenoid-operated rod to extend therethrough.

The connector assembly 340 provides an alternative means for engaging the connector assembly 340 by an ROV manipulator tool or a diver. The operation of connector assembly 340 is consistent with the operation of connector assembly 140, providing a like facility for ready disassembly.

The foregoing description of the invention illustrates a preferred embodiment and alternate embodiments thereof. Various changes may be made in the details of the illustrated construction within the scope of the appended claims without departing from the true spirit of the invention. The present invention should only be limited by the claims and their equivalents.

What is claimed is:

1. A method for installing a vortex induced vibration inhibitor around a structure, utilizing a remotely operated vehicle, comprising:
   an engaging step comprising engaging at least one receptor engagement slot coupled to at least one receptor assembly with a receptor engagement tool, and at least one insert engagement slot coupled to at least one insert assembly with an insert engagement tool, wherein said at least one receptor assembly and said at least one insert assembly are contained on a vortex induced vibration inhibitor of a type comprising a flexible, unitarily formed hollow cylindrical housing;
   a moving step comprising moving said vortex induced vibration inhibitor to a structure to be covered;
   an opening step comprising operating said housing to an open position;
   an extending step comprising extending said housing around said structure;
   a closing step comprising operating said housing to a closed position; and
   a disengaging step comprising disengaging each said receptor engagement tool from said corresponding receptor engagement slot, and disengaging each said insert engagement tool from said corresponding insert engagement slot.

2. The method of claim 1, further comprising:
   a locking step comprising locking said at least one receptor assembly to said at least one insert assembly.

3. A connector assembly for a vortex induced vibration inhibitor constructed as a hollow housing, said housing having a longitudinal opening defined by a first locking edge and a second locking edge, said housing operable between an open position and a closed position, said first and second locking edges separated in said open position and said first locking edge proximate said second locking edge in said closed position, comprising:
   a receptor assembly;
   an insert assembly;
   said insert assembly disposed at one of said first locking edge and said second locking edge;

said receptor assembly disposed at the other of said first locking edge and said second locking edge;
said insert assembly including a connector pin;
said receptor assembly including a receptor for receiving said connector pin;
said connector pin having an insert end and a second end;
at least one barb proximate said insert end;
said receptor having a receptor cavity defined by a receptor wall;
at least one groove provided interior of said receptor wall; and
said insert assembly and said receptor assembly aligned such that said connector pin is received in said receptor in said housing closed position with said at least one barb fixedly received in said at least one groove.

4. The device of claim 3, further comprising:
said insert assembly having an insert housing, a retainer pin opening in said insert housing and a retainer pin; and
said connector pin disconnectable from said insert housing upon removal of said retainer pin from said retainer pin opening.

5. The device of claim 4, further comprising:
said retainer pin having a grasping loop.

6. The device of claim 3, further comprising:
said receptor assembly having a receptor, a receptor housing, a retainer pin opening in said receptor and a retainer pin; and
said connector pin disconnectable from said receptor housing upon removal of said retainer pin from said retainer pin opening.

7. The device of claim 6, further comprising:
said retainer pin having a grasping loop.

8. The device of claim 3, further comprising:
said at least one barb comprising a plurality of barbs; and
said at least one groove comprising a plurality of grooves.

9. The device of claim 3, further comprising:
said at least one barb comprising a plurality of barbs; and
said connector pin insert end having a conical insert tip.

10. The device of claim 3, further comprising:
said insert assembly further comprising an insert housing;
said insert housing having a front wall and a rear wall;
an insert housing cavity extending through said housing front wall to said housing rear wall; and
said connector pin extending into said insert housing cavity.

11. The device of claim 10, further comprising:
said insert housing having a housing retainer pin opening extending laterally through at least one wall of said insert housing; and
said connector pin having a connector retainer pin opening intermediate said insert end and said second end.

12. The device of claim 11 further comprising:
said retainer pin extending through said insert housing retainer pin opening and said connector pin retainer pin opening.

13. The device of claim 3, further comprising:
said insert assembly further comprising an insert housing;
said insert housing having a front wall opening and a rear wall opening, and an insert housing cavity extending therebetween;
said connector pin extending through said insert housing cavity;
said connector pin second end extending outside said insert housing; and
a connector pin retainer pin opening provided in said connector pin intermediate said insert housing and said second pin end.

14. The device of claim 13, further comprising:
said retainer pin extending through said connector pin retainer pin opening.

15. The device of claim 14, further comprising:
a pin flange intermediate said insert housing and said connector pin retainer pin opening.

16. The device of claim 3, further comprising:
said insert assembly further comprising an insert housing; and
an insert engagement slot provided on said insert housing.

17. The device of claim 3, further comprising:
said receptor assembly further comprising a receptor housing; and
a receptor engagement slot provided on said receptor housing.

18. The device of claim 3, further comprising:
said receptor having a receiving end and a receptor second end;
said receptor assembly further comprising a receptor housing;
said receptor housing having a receptor housing front wall and a housing rear wall;
a front wall opening provided in said receptor housing front wall; and
said receptor extending through said receptor front wall.

19. The device of claim 18, further comprising:
said receptor housing having a receptor retainer pin opening extending laterally through at least one wall of said receptor housing;
said receptor having a retainer pin opening intermediate said receiving end and said second end, and
said receptor housing retainer pin opening and said receptor retainer pin opening aligned.

20. The device of claim 19, further comprising:
a retainer pin extending through said receptor housing retainer pin opening and said connector receptor retainer pin opening.

21. The device of claim 3, further comprising:
said receptor having a receiving end and a receptor second end;
said receptor assembly further comprising a receptor housing;
said receptor housing having a receptor housing front wall and a receptor housing rear wall;
an opening provided in said receptor housing front wall;
a receptor housing rear wall opening provided in said receptor housing rear wall;
said receptor extending through said receptor housing front wall opening and said receptor housing rear wall opening;
said receptor second end extending outside said receptor housing; and
a receptor retainer pin opening provided in said receptor intermediate said housing rear wall and said second receptor end.

22. The device of claim 21, further comprising:
a retainer pin extending through said retainer pin opening.

23. The device of claim 22, further comprising:
said retainer pin having a grasping loop.

24. The device of claim 21, further comprising:
said receptor constructed of at least two receptor wall segments;
said two receptor wall segments defining at least in part a hollow cylinder; and
said two receptor wall segments at least partially held in abutting relationship by a retaining sleeve.

25. The device of claim 24, further comprising:

a receptor flange segment extending outwardly from each of said at least two receptor wall segments;
said receptor flange segments intermediate said receiving end and said receptor second end;
said retaining sleeve sized to receive at least two receptor segments; and said retaining sleeve abutting said receptor flange segments.

* * * * *